(12) United States Patent
Doux et al.

(10) Patent No.: US 12,365,450 B2
(45) Date of Patent: Jul. 22, 2025

(54) STRUT FOR AIRCRAFT LANDING GEAR EQUIPPED WITH AN ACCUMULATOR, LANDING GEAR COMPRISING SUCH A STRUT, AND AIRCRAFT COMPRISING AT LEAST ONE SUCH LANDING GEAR

(71) Applicant: SAFRAN LANDING SYSTEMS, Velizy-Villacoublay (FR)

(72) Inventors: Aurélien Doux, Moissy-Cramayel (FR); David Frank, Moissy-Cramayel (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 0 days.

(21) Appl. No.: 18/836,970

(22) PCT Filed: Feb. 8, 2023

(86) PCT No.: PCT/EP2023/053038
§ 371 (c)(1),
(2) Date: Aug. 8, 2024

(87) PCT Pub. No.: WO2023/152149
PCT Pub. Date: Aug. 17, 2023

(65) Prior Publication Data
US 2025/0145280 A1  May 8, 2025

(30) Foreign Application Priority Data
Feb. 8, 2022  (FR) ........................ 2201073

(51) Int. Cl.
*B64C 25/22* (2006.01)
*B64C 25/34* (2006.01)
*B64C 25/62* (2006.01)

(52) U.S. Cl.
CPC .............. *B64C 25/22* (2013.01); *B64C 25/34* (2013.01); *B64C 25/62* (2013.01)

(58) Field of Classification Search
CPC .......... B64C 25/22; B64C 25/34; B64C 25/62
See application file for complete search history.

(56) References Cited

U.S. PATENT DOCUMENTS 3,889,904 A * 6/1975 Jones ........................ B64F 5/60
141/49
4,634,082 A * 1/1987 Kendall .................. B64C 25/60
244/102 R (Continued)

FOREIGN PATENT DOCUMENTS

EP   3546349 A1   10/2019
FR   842612 A    6/1939

(Continued)

OTHER PUBLICATIONS

International Search Report mailed May 15, 2023, issued in corresponding International Application No. PCT/EP2023/053038, filed Feb. 8, 2023, 6 pages.

(Continued)

*Primary Examiner* — Assres H Woldemaryam
(74) *Attorney, Agent, or Firm* — CHRISTENSEN O'CONNOR JOHNSON KINDNESS PLLC

(57) ABSTRACT

A strut for an aircraft landing gear is provided. The strut includes a casing configured to absorb landing forces applied to the aircraft landing gear. The casing includes a cavity in which an energy accumulator is housed. The energy accumulator can be a removable cartridge which can be inserted in the cavity. An aircraft landing gear comprising such a strut is also provided. An aircraft comprising at least one such landing gear having such a strut is also provided. A method for emergency deployment of such a landing gear, using energy stored in the energy accumulator integrated in the strut of the landing gear to deploy the landing gear is also provided.

7 Claims, 4 Drawing Sheets

(56) References Cited

U.S. PATENT DOCUMENTS

| | | | | |
|---|---|---|---|---|
| 4,687,158 | A | * | 8/1987 | Kettering .............. B64C 25/001 244/102 R |
| 10,578,176 | B2 | * | 3/2020 | Grazebrook .......... F16D 65/853 |
| 2018/0290734 | A1 | * | 10/2018 | Mellor .................... B64C 25/34 |
| 2019/0300160 | A1 | * | 10/2019 | Moxon ..................... B64C 3/16 |
| 2021/0140539 | A1 | * | 5/2021 | Allen ...................... B64C 25/50 |

FOREIGN PATENT DOCUMENTS

| | | | |
|---|---|---|---|
| FR | 3018501 A1 | 9/2015 | |
| GB | 520994 A | 5/1940 | |
| GB | 520995 A | 5/1940 | |
| RU | 2243925 C2 * | 1/2005 | ............. B64D 37/12 |

OTHER PUBLICATIONS

Written Opinion mailed May 15, 2023, issued in corresponding International Application No. PCT/EP2023/053038, filed Feb. 8, 2023, 8 pages.

* cited by examiner

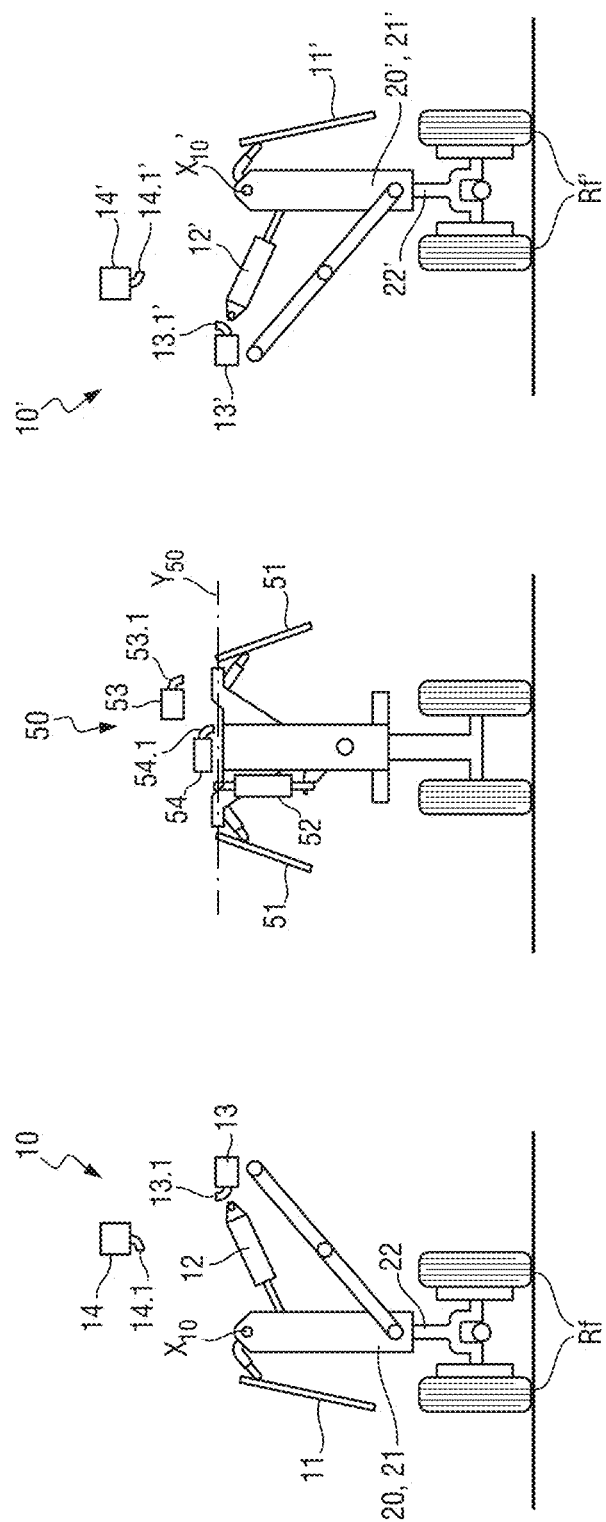
Fig. 2
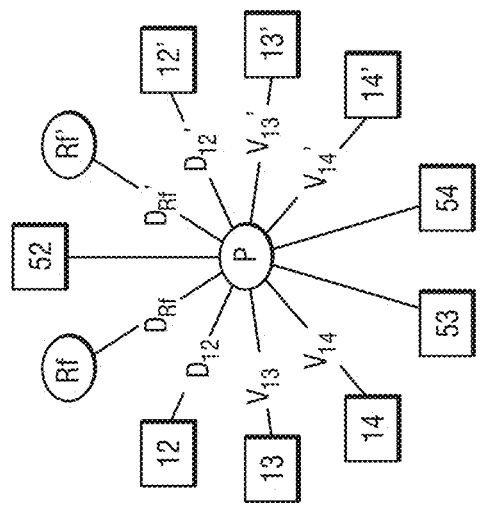

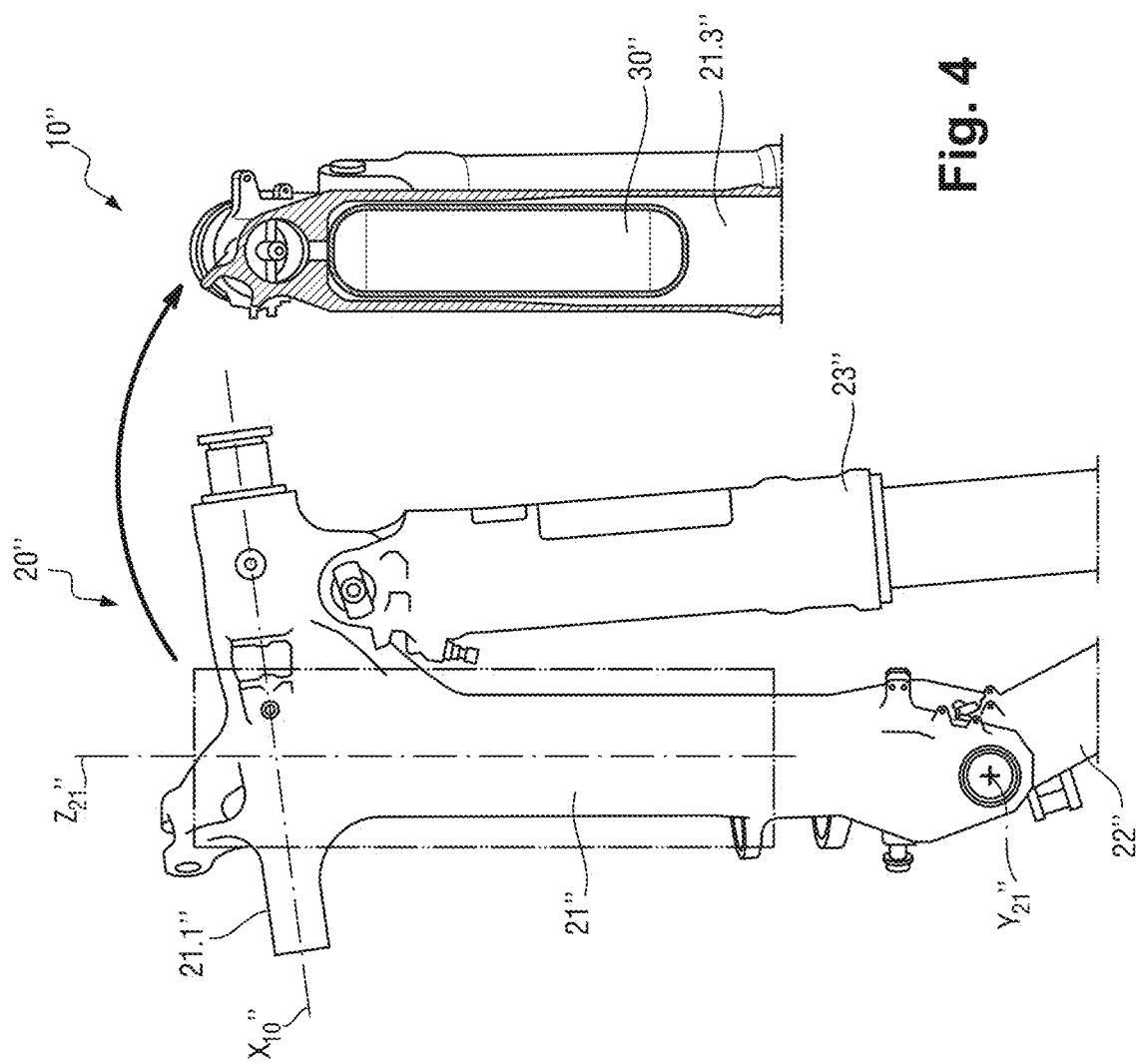

STRUT FOR AIRCRAFT LANDING GEAR EQUIPPED WITH AN ACCUMULATOR, LANDING GEAR COMPRISING SUCH A STRUT, AND AIRCRAFT COMPRISING AT LEAST ONE SUCH LANDING GEAR

CROSS-REFERENCE TO RELATED APPLICATIONS

This application is a National Stage of International Application No. PCT/EP2023/053038, filed Feb. 8, 2023, which claims priority to French Patent Application No. 2201073, filed Feb. 8, 2022, the entire disclosures of which are hereby incorporated by reference in their entirety for all purposes.

The present invention relates to the field of landing gears and more specifically, the integration of an accumulator in an aircraft landing gear.

BACKGROUND OF THE INVENTION

Aircrafts provided with retractable landing gears are known, with holds intended to receive these landing gears when the aircraft is in flight, and with doors for closing these holds. A landing gear generally comprises a strut having a first end connected to a structure of the aircraft and a second end provided with an axle on which wheels are mounted, making it possible to move the aircraft on the ground (taxiing, braking, steering, etc.). At least one of the wheels is equipped with a brake comprising friction elements, such as discs, some of them secured to the wheel, and for others to a stator, and a hydraulic jack arranged to exert a sufficient force on the friction elements to rotatably block the wheel.

In normal mode, landing gears are generally deployed by means of a hydraulic circuit comprising hydraulic components, adapted to work in sequence to unlock and open the landing gear doors, then unlock and/or deploy the landing gears, and optionally close and relock at least some doors. The hydraulic circuit also comprises hydraulic components adapted to control the braking of the wheels of the landing gears.

In case of failure of the hydraulic circuit, it is provided with emergency means to ensure the opening of the doors and/or the deployment of the landing gears and/or the braking of the wheels. The emergency means can comprise a hydraulic energy reserve arranged to power, in emergency mode, the wheel brakes and the unlocking actuators of the landing gears and of the doors.

This energy reserve comprises one or two hydraulic accumulators which are generally housed in the holds in the proximity of the landing gears, due to their size, to their mass and regulations (European Union Aviation Safety Agency, Federal Aviation Administration, etc.), which imposes a physical separation between the accumulator the and equipment which surrounds it by a distance being able to go up to 1.54 metres to overcome any risk of explosion.

Yet, the integration of the accumulators in the holds has proved to be difficult, due to the little space available in said holds.

AIM OF THE INVENTION

The invention aims to propose a solution overcoming at least some of the abovementioned disadvantages.

SUMMARY OF THE INVENTION

To this end, a strut for aircraft landing gear is proposed, comprising a casing arranged to take up landing forces and provided with a cavity in which an energy accumulator is housed.

Thus, the casing ensures two functions, namely the taking up of landing forces and the housing of the energy accumulator. Furthermore, the casing can be arranged to mechanically protect the accumulator.

Particularly, the accumulator is hydraulic.

Particularly, the accumulator is an electrochemical battery.

Particularly, the accumulator is in the form of a cartridge which can be inserted in the cavity.

According to a particular embodiment of the invention, the strut comprises a rod forming a damper sliding into the casing, an end of the rod carrying at least one wheel.

According to a variant of the invention, the strut comprises a rocker arm articulated on the casing and a damper connecting the rocker arm to the casing, an end of the rocker arm carrying at least one wheel.

The invention also relates to an aircraft landing gear comprising such a strut.

The invention also relates to an aircraft comprising at least one such landing gear.

Particularly, the casing of the landing gear is articulated on a structure of the aircraft.

The invention further relates to a method for emergency deployment of such a landing gear using the accumulator integrated to the strut of the landing gear.

BRIEF DESCRIPTION OF THE DRAWINGS

The invention will be best understood in the light of the description below, which is purely illustrative and non-limiting, and must be read regarding the accompanying figures, among which:

FIG. 2 is a schematic view of the landing gears of the aircraft illustrated in FIG. 1;

FIG. 4 illustrates a variant of the strut illustrated in FIG. 3.

DETAILED DESCRIPTION OF THE INVENTION

Figure 1:
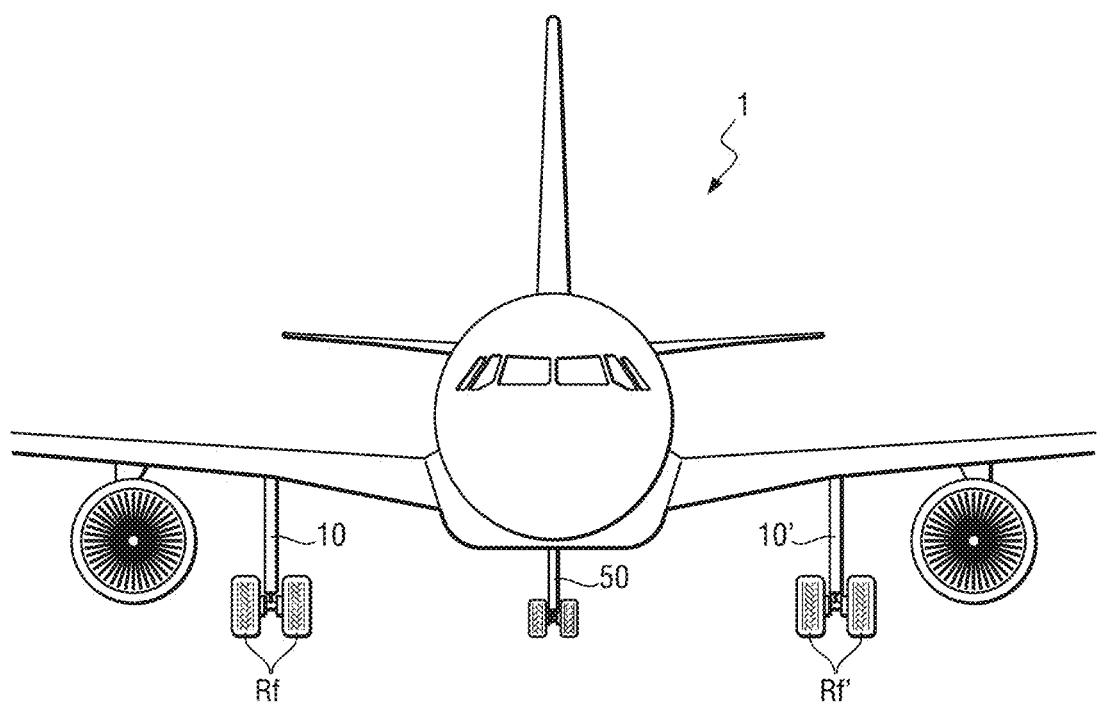
FIG. 1 is a schematic view of an aircraft comprising retractable landing gears.

As illustrated in FIG. 1, the invention is, in this case, described in application to an aircraft 1 comprising two main landing gears 10 and a front auxiliary landing gear 50.

In reference to FIG. 2, the main landing gears 10 are articulated on a structure of the aircraft 1 about an axis $X_{10}$, $X_{10}'$ substantially parallel to a forward direction of said aircraft 1, between a deployed position illustrated, in this case, and a retracted position, in which the main landing gears 10, 10' are received in a hold which can be closed by a door 11, 11'. Double-acting hydraulic jacks 12, 12' are coupled to the main landing gears 10, 10' and make it possible to move these between the deployed position and the retracted position. The main landing gears 10, 10' are held in the retracted position by attachment housings 13, 13' provided with hooks 13.1, 13.1' making it possible to hook tapped nuts secured to the main landing gears 10, 10' when the latter arrive in the retracted position. The unhooking of the hooks 13.1, 13.1' is controlled by hydromechanical unlocking actuators (not represented) which are, in this case, integrated in the attachment housings 13, 13'.

Similarly, jacks (not represented) are coupled to the doors 11, 11' and make it possible to move these between an open position enabling the deployment and the retraction of the main landing gears 10, 10', and a closed position closing the holds. The doors 11, 11' are held in the closed position by attachment housings 14, 14' secured to the structure of the aircraft 1. The attachment housings 14, 14' are provided with hooks 14.1, 14.1' making it possible to hook tapped nuts secured to the doors 11, 11' when the latter arrive in the closed position. The unhooking of the hooks 14.1, 14.1' is controlled by hydromechanical unlocking actuators (not represented) which are, in this case, integrated in the attachment housings 14, 14'.

The jacks 12, 12' serving to move the main landing gears 10, 10' are controlled by a distributor $D_{12}$, $D_{12}'$ connected to a pressurised fluid source P. The unlocking actuators making it possible to deactivate the attachment housings 13, 13', 14, 14' are controlled by a valve $V_{13}$, $V_{13}'$, $V_{14}$, $V_{14}'$ connected to the pressurised fluid source P.

The auxiliary landing gear 50 is articulated on the structure of the aircraft 1 about an axis $Y_{50}$, substantially orthogonal to a forward direction of said aircraft 1, between a deployed position illustrated, in this case, and a retracted position in which the auxiliary landing gear is received in a hold which can be closed by the doors 51. A double-acting hydraulic jack 52 is coupled to the auxiliary landing gear 50 and makes it possible to move it between the deployed position and the retracted position. The auxiliary landing gear 50 is held in the retracted position by an attachment housing 53 provided with a hook 53.1 making it possible to hook a tapped nut secured to the auxiliary landing gear when the latter arrives in the retracted position. The unhooking of the hook 53.1 is controlled by a hydromechanical unlocking actuator (not represented) which is, in this case, integrated in the attachment housing 53.

Similarly, jacks (not represented) are coupled to the doors 51 and make it possible to move these between an open position enabling the deployment and the retraction of the auxiliary landing gears 50, and a closed position closing the holds. The doors 51 are held in the closed position by an attachment housing 54 secured to the structure of the aircraft 1. The attachment housing 54 is provided with a hook 54.1 making it possible to hook tapped nuts secured to the doors 51 when the latter arrive in the closed position. The unhooking of the hook 54.1 is controlled by a hydromechanical unlocking actuator (not represented) which is, in this case, integrated in the attachment housing 54.

The jack 52 serving to move the auxiliary landing gear 50 is controlled by a distributor $D_{52}$ connected to the pressurised fluid source P. The unlocking actuators making it possible to deactivate the attachment housings 53, 54 are controlled by a valve $V_{53}$, $V_{54}$, connected to the pressurised fluid source P.

Figure 3:
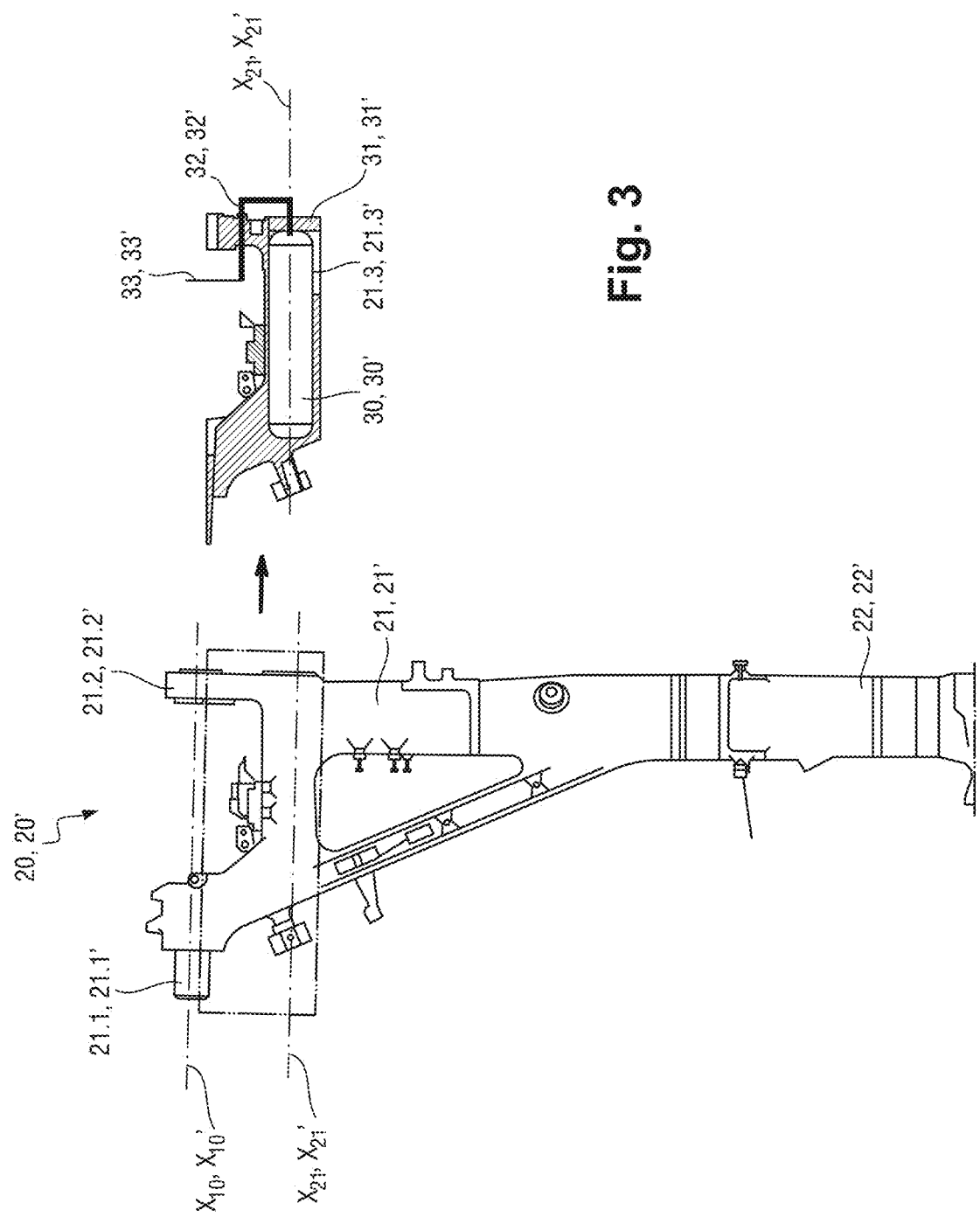
FIG. 3 illustrates a strut, according to a particular embodiment of the invention, of one of the landing gears illustrated in FIG. 2.

In reference to FIGS. 2 and 3, the main landing gears 10, 10' comprise a strut 20, 20' comprising a rigid casing 21, 21' in which a telescopic rod 22, 22' slides, forming a damper. An end of the rod 22, 22' is provided with an axle on which at least one wheel $R_f$, $R_f'$ is rotatably mounted. The wheel $R_f$, $R_f'$ is equipped with a brake which is controlled by a distributor $D_{Rf}$, $D_{Rf}'$ connected to the pressurised fluid source P.

The casing 21, 21' is mainly triangular-shaped and has a base being articulated on the structure of the aircraft 1 through two pivots 21.1, 21.2, 21.1', 21.2' of axis $X_{10}$, $X_{10}'$, the top opposite the base forming a housing in which the rod 22 slides.

The base of the casing 21, 21' extends along an axis $X_{21}$, $X_{21}'$ substantially parallel to the axis $X_{10}$ and comprises, according to the invention, a cavity 21.3, 21.3' in which a hydraulic accumulator 30, 30' is fully housed. The cavity 21.3, 21.3' and the accumulator are mainly cylindrically-shaped and extend coaxially along the axis $X_{21}$, $X_{21}'$. An outer surface of the accumulator 30, 30' is, in this case, shaped to engage with an inner surface of the cavity 21.3, 21.3' so as to produce a short centring of the accumulator 30, 30' in said cavity 21.3, 21.3'. The outer surface will comprise, for example, three bosses distributed at 120 degrees and forming a substantially cylindrical bearing surface. A centring plate locked by a segment provided at an end of the cavity 21.3, 21.3' ensures the immobilisation of the accumulator inside said cavity 21.3, 21.3'.

The accumulator 30, 30' has, in this case, a diameter substantially equal to 120 millimetres and a length substantially equal to 570 millimetres for a useful inner volume substantially equal to 6 litres.

The end of the cavity 21.3, 21.3' opens onto a side of the casing 21, 21' and makes it possible for the accumulator 30, 30' to be inserted in the form of a removable cartridge in said cavity 21.3, 21.3'. A shutter 31, 31' being able to be secured to the accumulator 30, 30' closes the cavity 21.3, 21.3' in order to isolate said accumulator 30, 30' from the outside and thus protect it from external attacks (water projections, gravel projections, etc.). Moreover, it is noted that the casing 21, 21' is sized to support the landing forces and that this sizing enables it to resist a possible bursting of the accumulator 30, 30'.

The accumulator 30, 30' forms a pressurised fluid reserve connected:

to all or some of the attachment housings 13, 13' so as to enable the unhooking of the hooks 13.1, 13.1' and therefore the deployment of the main landing gears 10, 10' in case of failure of the pressurised fluid source P or of the hydraulic circuit connecting said pressurised fluid source P to said attachment housings 13, 13'; and/or to all or some of the attachment housings 14, 14' so as to enable the unhooking of the hooks 14.1, 14.1' and therefore the opening of the doors 11, 11' in case of failure of the pressurised fluid source P or of the hydraulic circuit connecting said pressurised fluid source P to said attachment housings 14, 14'; and/or to all or some of the brakes of the wheels $R_f$, $R_f'$ so as to enable the braking of said wheels $R_f$, $R_f'$ and therefore the slowing down and the stationary holding of the aircraft 1 in case of failure of the pressurised fluid source P or of the hydraulic circuit connecting said pressurised fluid source P to said brakes of the wheels $R_f$, $R_f'$.

The accumulator 30, 30' thus forms an emergency energy source making it possible to power the attachment housings 13, 13', 14, 14' and/or the brakes of the wheels $R_f$, $R_f'$ in case of failure of the main power supply circuit of the aircraft 1.

The accumulator 30, 30' is, in this case, connected to the unlocking actuators of the attachment housings 13, 13', 14, 14' via a rigid pipe 32, 32' passing through the shutter 31, 31' and which is fastened on the casing 21, 21'. The rigid pipe 32, 32' comprises a first end connected to an output port of the accumulator 30, 30', and a second end connected to a flexible pipe 33, 33' enabling the deployment and the raising of the landing gear 10, 10'.

The accumulator 30, 30' can also be connected:

- to the attachment housing 53 so as to enable the unhooking of the hook 53.1 and therefore the deployment of the auxiliary landing gear 50 in case of failure of the pressurised fluid source P or of the hydraulic circuit connecting said pressurised fluid source P to said attachment housing 53; and/or
- to the attachment housing 54 so as to enable the unhooking of the hook 54 and therefore the opening of the doors 51 in case of failure of the pressurised fluid source P or of the hydraulic circuit connecting said pressurised fluid source P to said attachment housing 54; and/or
- to possible wheel brakes equipping the landing gear 50 so as to enable the braking of these wheels and therefore the slowing down and the stationary holding of the aircraft 1 in case of failure of the pressurised fluid source P or of the hydraulic circuit connecting said pressurised fluid source P to said possible wheel brakes.

The accumulator 30, 30' will thus form an emergency energy source making it possible to power the attachment housings 53, 54 and/or the wheel brakes of the auxiliary landing gear 50 in case of failure of the main power supply circuit of the aircraft 1.

FIG. 4 illustrates a main landing gear 10" which is no other than a variant of the main landing gears 10, 10'. The main landing gear 10" comprises a strut 20" comprising a rigid casing 21", an upper end of which is articulated on the structure of the aircraft 1 about the axis $X_{10}$, and a rocker arm 22" articulated on a lower end of the casing 21" about an axis $Y_{21}"$ substantially orthogonal to the forward direction of the aircraft 1. An end of the rocker arm 22" is provided with an axle on which the wheels $R_f$ are rotatably mounted. A damper 23" connects the casing 21" to the rocker arm 22".

The casing 21" is mainly T-shaped comprising a rectilinear upper part being articulated on the structure of the aircraft 1 through a pivot 21.1" of axis $X_{10}$, and a rectilinear lower part comprising, according to the invention, a cavity 21.3" in which a hydraulic accumulator 30" is fully housed. The cavity 21.3" and the accumulator 30" are mainly cylindrically-shaped and extend coaxially along an axis $Z_{21}"$ An outer surface of the accumulator 30" is shaped to engage with an inner surface of the cavity 21.3" so as to produce a short centring of the accumulator in said cavity 21.3". The outer surface will comprise, for example, three bosses distributed at 120 degrees and forming a substantially cylindrical bearing surface. A centring plate locked by a segment provided at an end of the cavity 213" ensures the immobilisation of the accumulator inside said cavity 21.3".

The accumulator 30" has, in this case, a diameter substantially equal to 100 millimetres and a length substantially equal to 410 millimetres for a useful internal volume substantially equal to 3 litres.

The end of the cavity 21.3" opens onto the lower end of the casing 21" and makes it possible for the accumulator 30" to be inserted in the form of a removable cartridge in said cavity 21.3" with the dismounting of the rocker arm 22". A shutter (not represented) being able to be secured to the accumulator 30" closes the cavity in order to isolate said accumulator 30" from the outside and thus protect it from external attacks (water projections, gravel projections, etc.).

Similarly to the accumulator 30, the accumulator 30" forms a pressurised fluid reserve connected:

- to all or some of the attachment housings 13, 13' so as to enable the unhooking of the hooks 13.1, 13.1' and therefore the deployment of the main landing gears 10, 10' in case of failure of the pressurised fluid source P or of the hydraulic circuit connecting said pressurised fluid source P to said attachment housings 13, 13'; and/or
- to all or some of the attachment housings 14, 14' so as to enable the unhooking of the hooks 14.1, 14.1' and therefore the opening of the doors 11, 11' in case of failure of the pressurised fluid source P or of the hydraulic circuit connecting said pressurised fluid source P to said attachment housings 14, 14'; and/or
- to all or some of the brakes of the wheels $R_f$, $R_f'$ so as to enable the braking of said wheels $R_f$, $R_f'$ and therefore the slowing down and the stationary holding of the aircraft 1 in case of failure of the pressurised fluid source P or of the hydraulic circuit connecting said pressurised fluid source P to said brakes of the wheels $R_f$, $R_f'$.

The accumulator 30" thus forms an emergency energy source making it possible to power the attachment housings 13, 13', 14, 14' and/or the brakes of the wheels $R_f$, $R_f'$ in case of failure of the main power supply circuit of the aircraft 1.

The accumulator 30" is connected to the unlocking actuators of the attachment housings 13, 13', 14, 14' via a rigid pipe passing through the casing 21 in the top part (at the axis $X_{10}$) or in the bottom part (at the axis $Y_{21}"$) and which goes back along the casing to be connected to a flexible pipe enabling the deployment and the raising of the landing gear 10".

Such an arrangement of the accumulators 30, 30', 30" have the following advantages:

- installation of the accumulators 30, 30', 30" closer to the attachment housings 13, 13', 14, 14' and to the brakes of the wheels $R_f$, $R_f'$;
- freeing up space and constraints induced on other equipment arranged in the holds receiving the landing gears 10, 10', 10";
- respecting the regulatory requirements imposing a physical separation between the emergency equipment by a distance at least equal to 1.54 metres to overcome the risk of explosion (CS 25.795 certification).

Preferably, accumulators will be chosen which require no or little maintenance, in particular when changing the accumulator requires the dismounting of the rocker arm, as is the case for the landing gear 10".

Naturally, the invention is not limited to the embodiment described, but covers any variant coming within the scope of the invention as defined by the claims.

Although the accumulators 30, 30', 30" are, in this case, hydraulic, they can also be electric and thus be presented in the form of batteries (for example, of the electrochemical type), in particular when the brake and/or the system for unlocking the landing gears and/or the doors is electric.

By casing, this means any part of the landing gear which is capable of taking up landing forces and which delimits a housing for the accumulator, whether the casing of the damper jack forming the strut itself, a rocker arm or another element of the landing gear. The auxiliary landing gear 50 can thus comprise a strut comprising a casing articulated on the structure of the aircraft, and in which an accumulator is integrated.

The accumulator 30, 30' can be connected to any actuator present in a landing gear, like a claw jack used instead of an attachment housing.

The invention claimed is:

1. A strut of an aircraft landing gear, the strut comprising a casing configured to absorb landing forces applied to the aircraft landing gear, the casing having a cavity in which an energy accumulator is housed, wherein the energy accumulator is a removable hydraulic cartridge or a removable electrochemical battery cartridge which is configured to be inserted in the cavity.

2. The strut according to claim 1, further comprising a rod forming a damper slidable into the casing, wherein an end of the rod carries at least one wheel.

3. The strut according to claim 1, further comprising a rocker arm articulable on the casing and a damper connecting the rocker arm to the casing, wherein an end of the rocker arm carries at least one wheel.

4. An aircraft landing gear comprising a strut according to claim 1.

5. An aircraft comprising at least one landing gear comprising a strut according to claim 1.

6. The aircraft according to claim 5, wherein the casing of the landing gear is articulable on a structure of the aircraft.

7. A method of emergency deployment of a landing gear comprising a strut according to claim 1, the method comprising using energy stored in the energy accumulator integrated in the strut of the landing gear to deploy the landing gear.

* * * * *